April 16, 1929. C. E. COLEMAN ET AL 1,708,937
METHOD OF AND APPARATUS FOR DRYING CELLULOSE TUBING
Filed Aug. 26, 1925
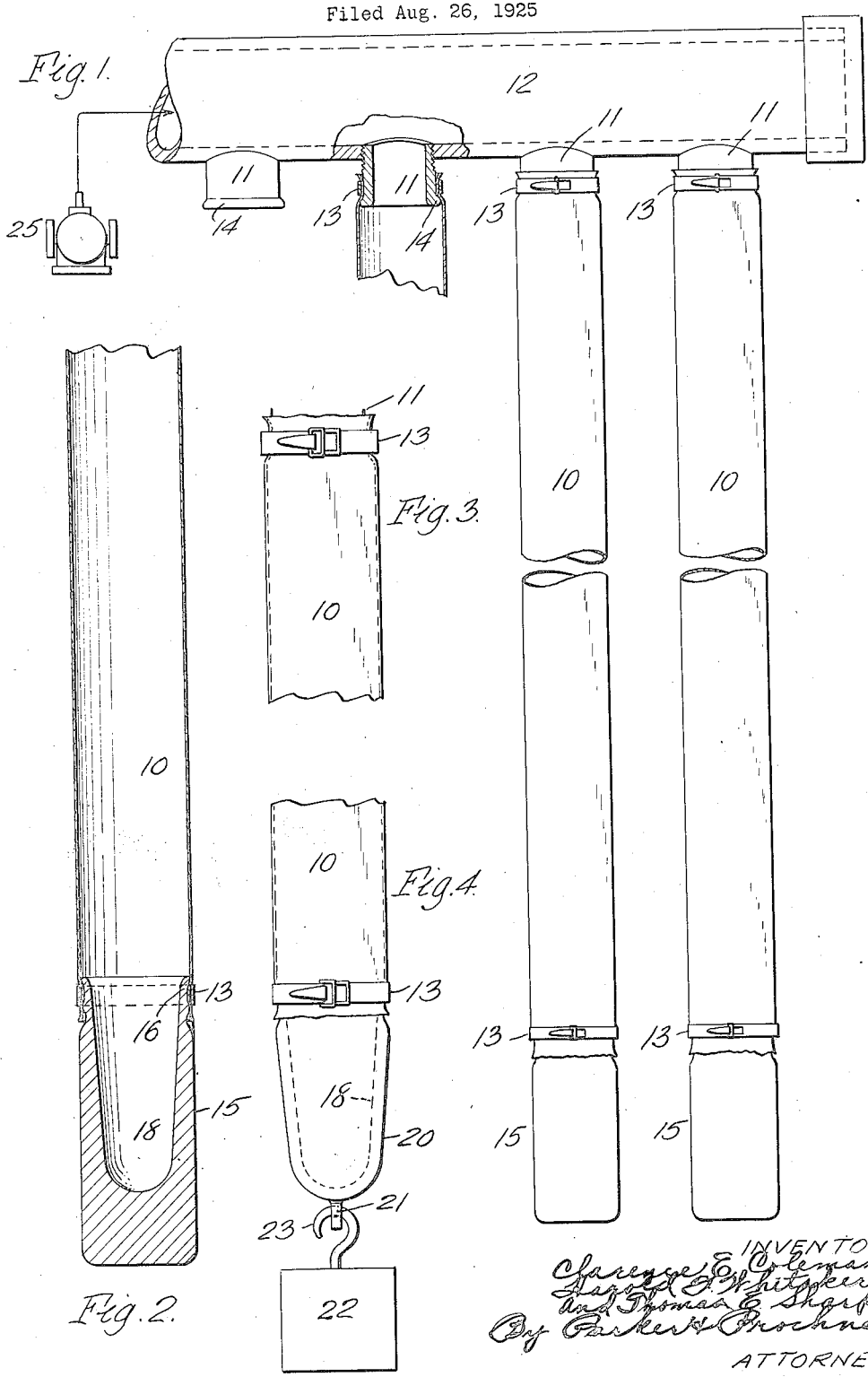

Patented Apr. 16, 1929.

1,708,937

UNITED STATES PATENT OFFICE.

CLARENCE E. COLEMAN AND HAROLD F. WHITTAKER, OF BUFFALO, NEW YORK, AND THOMAS E. SHARPE, OF OLD HICKORY, TENNESSEE, ASSIGNORS TO DU PONT CELLO-PHANE COMPANY, INC., A CORPORATION OF DELAWARE.

METHOD OF AND APPARATUS FOR DRYING CELLULOSE TUBING.

Application filed August 26, 1925. Serial No. 52,666.

This invention relates to a method or process of and means for drying or treating tubular cellulose products and other analogous products of a yielding nature which are formed with continuous walls.

The tubing, after being formed from a viscose and then treated to harden or set the viscose, is finally washed to free it from chemicals and impurities, and is then ready for use as sausage casings and for other purposes in a wet condition, or the tubing may be dried, which toughens the product and renders it transparent, in which condition it is suitable for use on large sausages and in packing or wrapping various substances or articles.

The present invention relates particularly to an improved method or process of and means for drying relatively long lengths or tubular sections formed of cellulose, but said invention may, however, be practiced in drying tubing formed of other analogous substances.

The wet cellulose product tends to shrink considerably during ordinary drying treatments, and in the case of tubular sections, it is essential in the making of a good commercial product to dry the material so that an article of maximum strength, uniform texture, transparent appearance, and uniform size or diameter results. It has been found that such results cannot be obtained by the usual methods of winding the wet tubes, or extending them between or on supports to dry, for the reason that due to the tendency of the material to shrink, it will be dried with a wrinkled, and unattractive appearance, and will be of uncertain and varying dimensions. Also the product is flattened resulting in creases which tend to weaken the walls of the product.

The objects of the present invention are to provide a method or process of and means for drying tubular cellulose products or other like products having substantially continuous side walls, whereby the product will be dried in a uniform manner such that the product will maintain its intended shape and the walls thereof be substantially smooth, of maximum strength, and of uniform diameter or dimensions, texture and transparency; also to dry such products so that while the material shrinks due to its natural characteristics, such shrinking will be uniform and will also be reduced to a minimum.

Other objects are to provide means upon which tubular cellulose or analogous products may be suspended, so as to depend vertically while drying, said means being capable of introducing a yielding or cushioning medium within the sections adapted to slightly distend the walls of the tube and maintain them in their intended form and prevent them from twisting collapsing, wrinkling or shrinking transversely while drying; also to provide means to reduce lengthwise shrinking of the tubular sections to a minimum; also to provide a method of and means for removing or drawing the free water from the inside of the tubing out of contact with the walls of the tubing so that substantially the whole of each length of tubing will be uniformly dried without waste.

Other objects are to provide means for the above purposes adapted for use for quantity production, so that the product may be dried quickly and in an inexpensive manner, and also to improve methods or processes of and means for drying sections of cellulose tubing and tubing formed of analogous materials.

In the drawings:

Fig. 1 shows a plurality of the tubular cellulose sections and a disclosure of an embodiment of our invention showing the means on which the tubes are dried in accordance with our method.

Fig. 2 is a fragmentary sectional elevation of a portion of one of the tubes, and a portion of the apparatus or means shown in Fig. 1.

Fig. 3 is a side elevation of one end of one of the tubes, and the means for attaching it to the drying means.

Fig. 4 is a similar view showing the opposite end of the tube attached to the means for preventing excessive longitudinal shrinking and for draining surface water or other liquid from the inside of the tubes, these means, in this figure, being of slightly different construction to that shown in Figs. 1 and 2.

In accordance with our process, the wet cellulose tubes are suspended so as to hang substantially vertically with their lower ends free. The connection of the tubes with the support is made airtight, and the lower ends of the tubes are closed or rendered airtight in a suitable manner, and air or other gas under moderate pressure, which may range from one-half ounce to ten pounds per square inch, is introduced into the tubes and maintained therein during the drying of said tubes so as to yeildingly distend and support the tube walls, maintain them in their intended form, and prevent excessive circumferential shrinking. A weight or other yielding means may also be applied to the lower ends of the tubes to prevent excessive longitudinal shrinking and permit the tubes to dry in straight lengths. The free water, or other liquid, adhering to the inner walls of the tubes is drained away therefrom so that the tubes may dry throughout substantially their entire length without waste due to the collection of the liquid at the lower ends of the tubes, which would remain in contact therewith and prevent these portions from drying. By suspending the tubes and introducing the air under low, constant pressures, the liquid evaporates, leaving a substantially pure cellulose tube which dries in a tough, transparent condition.

In the embodiment of the invention shown in the drawings for practicing the above described method, the cellulose tube sections 10 are secured at their upper ends while in their wet, pliant condition, to tubular nipples or fittings 11, which depend from a manifold or header 12. The tube sections 10 may be secured to the fittings in any suitable manner, preferably by means of quick detachable rings or clips 13 of any suitable or desirable construction adapted to form a substantially airtight joint between the tubes and the nipples, and so that the tubes may be quickly attached to and removed from the fittings 11. The lower edges of the nipples are preferably formed in any suitable manner for preventing the tubes from slipping off or becoming detached therefrom, an annular bead or flange 14 being provided for this purpose. The other or lower end of each tube is attached to a device which is adapted to close the lower end of the tube and render the same airtight to permit the desired constant air pressure to be maintained. At the same time, this device constitutes a weight adapted to exert a moderate pull or strain on the tubes to hold them straight and uniform and prevent undue longitudinal shrinking of said tubes.

In the form shown in Figs. 1 and 2, this weight and closure device comprises a casting or member 15, the upper end 16 of which is of annular formation of substantially the same diameter as the open ends of the fittings 11, and is adapted to be received in the lower end of the tube which is attached thereto by means of clips 13 similar to those before mentioned, which also render the lower ends of the tubes airtight. If desired, the upper ends 16 of the members 15 may be provided with horizontal or annular grooves or corrugations to prevent disengagement of said fittings from the end of the tubes.

The lower end of the fitting 15 is formed so as to contain sufficient metal to exert the desired pull for restraining the tube 10 and preventing excessive longitudinal shrinking thereof.

As before mentioned, the tubes are attached to the drying means while wet, and therefore there will be a certain amount of water or other liquid on the inner walls of the tubes which will flow downwardly and collect at the closed lower ends of the tubes. To prevent this water from remaining within the lower portion of the tube, and thus preventing the proper drying and consequent waste of this portion, the fitting 15 is formed with a pocket 18 as shown, into which the liquid from the tube can drain, thus permitting the tube to dry uniformly substantially from one end to the other.

In the modified construction shown in Fig. 4, the fitting 15 is replaced by a cup shaped fitting 20, the upper end of which is formed and adapted to be secured to the lower end of the tube as in the first construction, while the lower end of said fitting, instead of being formed to constitute an integral weight, is provided with an apertured lug 21 to which a separate weight 22 may be attached by means of a hook 23 or the like. In this manner, the weight or pull on the tubes can be varied, if desired. Other yeilding means may be provided for exerting the necessary pull or tension on the sections.

After the upper ends of the tubes have been secured to the fittings 11, and the member 15 or 20, or their equivalents have been secured to the lower ends of the tubes to close them, air or other gas, under moderate pressure is introduced into the manifold 12 from any suitable, constant pressure source such as pump 25, and passes through the fittings 11 into the tubes 10. This moderate air pressure is sufficient to slightly distend the walls while wet, and hold them in their true and intended cylindrical form, and forms a cushion or yielding support for these walls which prevents them from collapsing, while nevertheless permitting the tubes to shrink slightly and uniformly, but not excessively during the drying operation. The pressure can often be held constant throughout the drying operation, but it is often found desirable to carry out the preliminary drying at a constant, low internal pressure, and then increase the pressure to a second constant value to complete the drying. By using two or more different but constant pressures for drying, a tough product free from wrinkles may be obtained where often a uniform drying with the same pressure throughout, would produce wrinkles. Thus with tubing about three inches in diameter, the preliminary internal drying pressure is held at ten ounces per square inch until wrinkles start to appear. The internal pressure is then raised to a constant pressure of one pound per square inch for the final step of the drying. It should be understood, however, that the pressures used are dependent both on the diameter and wall thickness of the tubing.

By drying the tubes as stated, a uniform and attractive commercial product results. The tubes, when dry, are glossy and transparent, and are tough and strong. The walls of the tube sections are maintained in cylindrical form, both by the air cushion within the tubes and the pull exerted by the weighted members at their lower ends, so that the tube walls are permitted to dry without wrinkles or creases, which, if present, would tend to weaken or crack the walls of the tubes and produce a product of inferior quality.

It is not intended to limit the means for accomplishing the foregoing result to the particular construction shown in the drawings, as it would be readily apparent that other means, or means of other construction may be adopted to permit the tubes to be supported, and the necessary constant air pressure introduced without departing from the spirit of this invention.

We claim as our invention:

1. The method of drying tubular sections formed of cellulose or other analogous substances, which consists in suspending the wet sections, closing one end of each section, introducing air or other gas under moderate pressure into said sections while suspended, and weighting the free end of each section to prevent excessive longitudinal shrinking thereof while drying.

2. The method of drying tubular sections formed of cellulose or other analogous substances, which consists in suspending the wet sections, closing one end of each section, introducing air or other gas under moderate controlled pressure into said sections while suspended to yieldingly support the walls thereof and prevent excessive transverse shrinking of the sections while drying, and weighting the free ends of each section to prevent excessive longitudinal shrinking of said sections while drying.

3. The method of drying cellulose or other tubes which are closed at one end, which includes introducing a gas into the open end of the tube at a substantially constant relatively low pressure for a predetermined period, and then increasing the pressure to a second constant value for a second predetermined period.

4. The method of drying cellulose or other tubes which includes subjecting the tube to a plurality of constant and progressively increased internal pressures at different periods in the drying process.

5. Means for drying tubular sections formed of wet cellulose or other analogous substances, including a support on which the sections may be suspended with one end of each section free, means for closing the free end of each section, and means for introducing air or a like medium under moderate controlled and successively increased pressures into said sections to yieldingly support the walls thereof.

6. Means for drying tubular sections formed of wet cellulose or other analogous substances, including a support on which the sections may be suspended with one end of each section free, means for closing the free end of each section, means for introducing air or a like medium under moderate controlled pressure into each section to yieldingly support the walls thereof, and means at the free ends of said sections for exerting a moderate endwise pull on said sections to prevent excessive longitudinal shrinking thereof while drying.

7. Means for drying tubular sections formed of wet cellulose or other analogous substances, including a support on which the sections may be suspended with one end of each section free, means for closing the free end of each section, means for introducing air or a like medium under moderate constant and controlled pressure into each section to yieldingly support the walls thereof, and means associated with said closing means adapted to exert a yielding endwise pull on said sections to prevent excessive longitudinal shrinking of said sections while drying.

8. Means for drying tubular sections formed of wet cellulose or other analogous substances, including a support on which the sections may be suspended with one end of each section free, means for closing the free end of each section, means for introducing air or a like medium under moderate pressure into each section to yieldingly support the walls thereof, and means for receiving the free liquid from the inside of said sections.

9. Means for drying tubular sections formed of wet cellulose or other analogous substances, including a support on which the sections may be suspended with one end of each section free, means for introducing air or a like medium under constant pressure into each section to yieldingly support the walls thereof, and a device adapted to be detachably secured to the free end of each section to close the same and including a weight for exerting an endwise pull on said section to prevent excessive longitudinal shrinking of said section while drying.

10. Means for drying tubular sections formed of wet cellulose or other analogous substance, including a support on which the sections may be suspended with one end of each section free, means for introducing air or a like medium under moderate pressure into each section to yieldingly support the walls thereof, and a device adapted to be detachably secured to the free end of each section to close the same including a weight for exerting an endwise pull on said section to prevent excessive longitudinal shrinking of said section while drying, said end closing device having a recess for receiving the free water from the inside of said section.

CLARENCE E. COLEMAN.
HAROLD F. WHITTAKER.
THOMAS E. SHARPE.